United States Patent
Yahiro

(10) Patent No.: US 6,542,293 B2
(45) Date of Patent: Apr. 1, 2003

(54) APPARATUS AND METHOD FOR OBSERVING BIOCHEMICAL SUBSTANCE

(75) Inventor: Kanji Yahiro, Onojyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/829,996

(22) Filed: Apr. 11, 2001

(65) Prior Publication Data

US 2001/0033414 A1 Oct. 25, 2001

(30) Foreign Application Priority Data

Apr. 12, 2000 (JP) .......................................... 2000-110289

(51) Int. Cl.$^7$ .............................................. G02B 21/00
(52) U.S. Cl. ........................ 359/383; 359/392; 359/398; 359/397; 250/201.3
(58) Field of Search ................................ 359/383, 396, 359/397, 398, 368, 379, 382, 392, 393; 250/201.3; 348/79

(56) References Cited

U.S. PATENT DOCUMENTS 4,677,286 A * 6/1987 Liu .......................... 250/201.3
5,781,303 A    7/1998 Berndt
5,870,200 A * 2/1999 Berndt ......................... 356/244

* cited by examiner

*Primary Examiner*—Cassandra Spyrou
*Assistant Examiner*—Lee A. Fineman
(74) *Attorney, Agent, or Firm*—Wenderoth, Lind & Ponack, L.L.P.

(57) ABSTRACT

A biochemical substance is efficiently observed with focusing accurately and rapidly on the substance disposed on an inside of a container. A focusing mark, which is used as a reference when a focal point of an optical system is adjusted, is disposed on the outside of a transparent bottom of each well in a micro plate. A focus-shift-distance corresponding to a distance between the mark and a desired position to be observed is determined. The optical system focuses on the mark, and then, the focal point the optical system is shifted by the focus-shift-distance. This shift allows an object to be focused on accurately and rapidly even when unclear images are obtained.

10 Claims, 5 Drawing Sheets

APPARATUS AND METHOD FOR OBSERVING BIOCHEMICAL SUBSTANCE

FIELD OF THE INVENTION

The present invention relates to an apparatus and method of observing biochemical substances, such as biocells, in a container such as a micro plate.

BACKGROUND OF THE INVENTION

In a biochemical experiment, a biochemical substance such as animal cells, plant cells and bacteria disposed on an inside surface of a container such as a micro plate are observed with a microscope. For this method of observation, generally, the biochemical substance disposed on the bottom surface in a well of the micro plate made of transparent materials is observed from below the well by the microscope.

The image obtained by the microscope observation of the biochemical substance, such as animal cells and plant cells, often has a pale color and a blurry outline. It is difficult to determine whether an object being observed is in focus or not. Therefore, manual focusing it takes a large amount of time. Furthermore, an automatic focusing function, which is necessary for an automatic observation, has been difficult to apply to observing biochemical substances.

SUMMARY OF THE INVENTION

An apparatus and method for rapidly focusing an biochemical substances accurately for effectively observing them are provided.

The observing apparatus comprises an optical system with which biochemical substances disposed on an inside surface of a transparent area of a container are observed from outside.

The apparatus further comprises a container having a focusing mark which is used as a reference for the optical system to focus, the focusing mark being disposed on the inside surface or the outside surface of the transparent area on which the biochemical substance is disposed, a container holder holding the container, a focus-shift means shifting a focal point of the optical system, focus-shift-distance-output means for outputting a distance where shifting the focal point is shifted as translated numeric data, and a focus position storing unit storing the focal point.

A method of observing biochemical substances using the above apparatus includes disposing the biochemical substances in the container having the focusing mark, focusing the optical system onto the focusing mark, and focusing the optical system on an position to be observed by shifting the focal point of the optical system by a predetermined focus-shift distance between the focusing mark and a desired position of the biochemical substance.

This method allows the optical system to focus on the substances accurately and rapidly at the desired position even when the image of the substances is unclear.

DESCRIPTION OF THE PREFERRED EMBODIMENT

Figure 1:
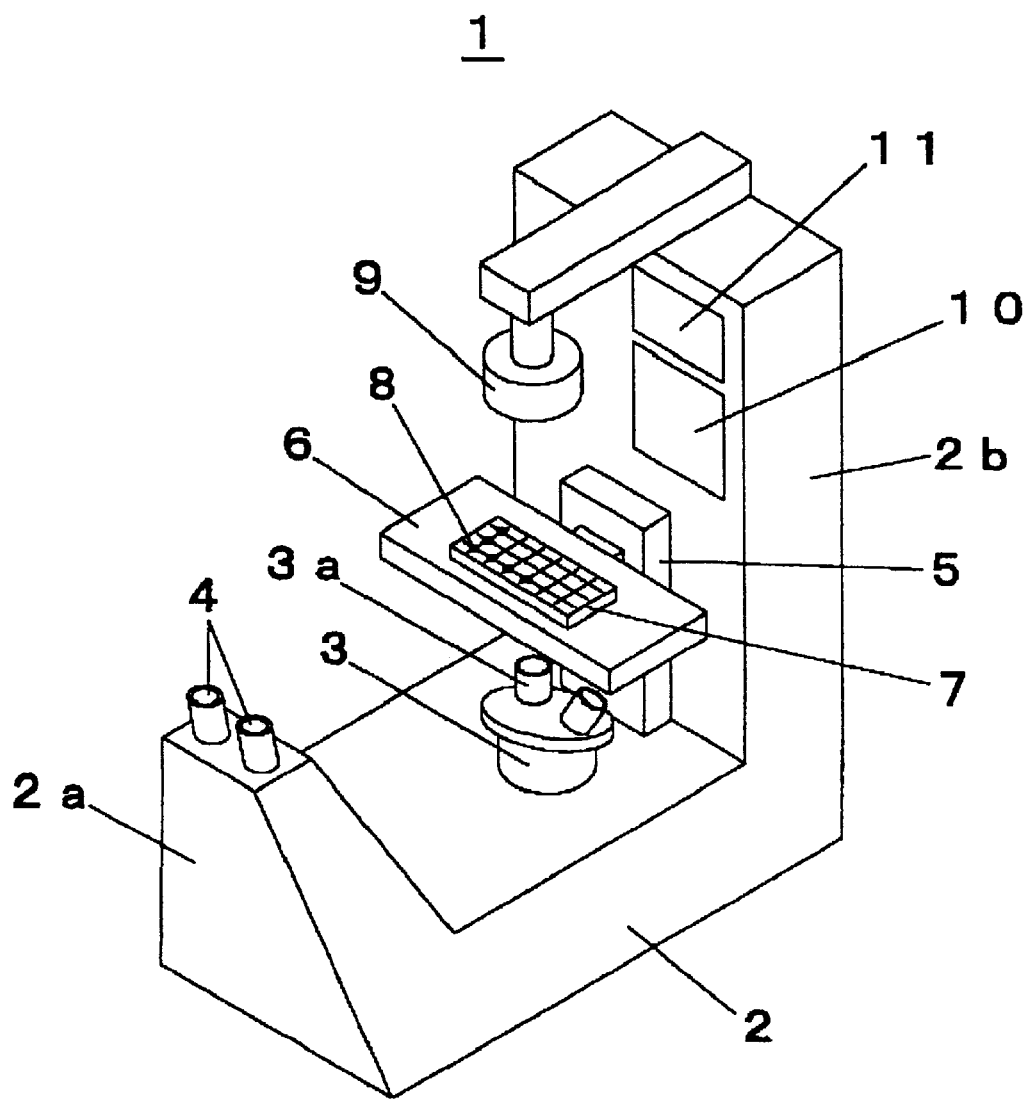
FIG. 1 is a perspective view of an observing apparatus for observing biochemical substances in accordance with an exemplary embodiment of the present invention.
Figure 2:
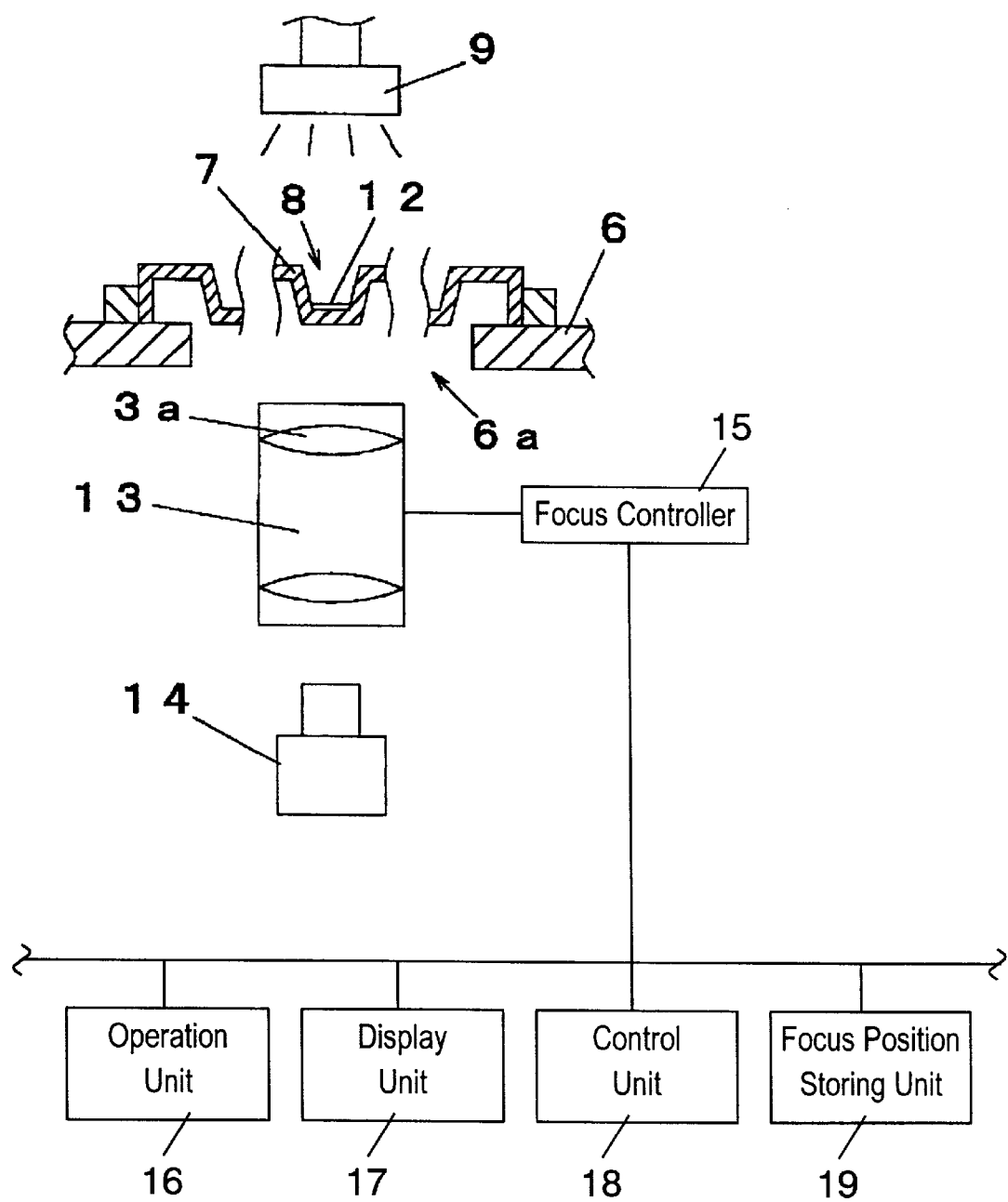
FIG. 2 is a functional block diagram of the apparatus for observing in accordance with the embodiment.
Figure 3A:
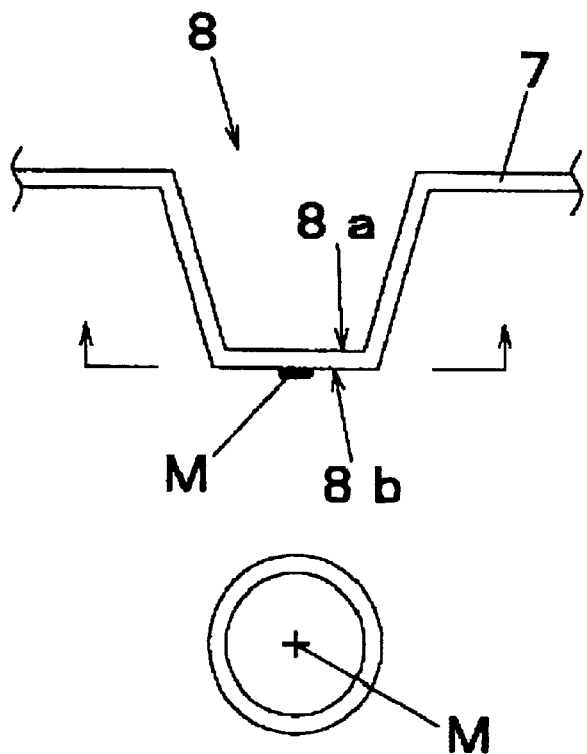
FIGS. 3A and B are partial cross sectional views of a micro plate in accordance with the embodiment.

FIG. 1 is a perspective view of an observing apparatus for observing a biochemical substance in an exemplary embodiment of the present invention. FIG. 2 is a functional block diagram of the apparatus. FIGS. 3A and B are partial cross sectional views of a micro plate. FIGS. 4A–D and FIGS. 5A–D illustrate a method for observing the biochemical substance in the embodiment.

A structure of the apparatus for observing biochemical substances will be explained with reference to FIG. 1. In FIG. 1, body 2 of biochemical-substance-observing-apparatus 1 has protruding section 2a protruding at the front portion of body 2 and rear wall 2b protruding vertically at the rear portion of body 2. Body tube 3 protrudes on body 2. Body tube 3 contains plural objectives 3a scaled by an observer. Eyepieces 4 are provided on the top of protruding section 2a. The optical system arranged in body 2 allows the object over objectives 3a to be scaled up with eyepieces 4. Container holder 6 movable by moving device 5 is disposed over body tube 3. Holder 6 holds micro plate 7 (hereafter called plate 7),i.e., a container. Plural wells 8, each of which is a cup-shaped recess and contains a liquid sample, are formed in plate 7. Wells 8 contain a biochemical substance to be observed, as described below. Monitor 10 and control panel 11 are disposed on the front side of rear-wall 2b.

Lamp 9 extends horizontally from the top of rear-wall 2b and is disposed over container holder 6.

When lamp 9 illuminates plate 7 held by holder 6, the biochemical substance in well 8 is observed by the optical system having objectives 3a and eyepieces 4. The observer shifts plate 7 by moving device 5 and observes the substance at a desired position of plate 7. A camera is built into body 2 to capture microscope images via objectives 3a. The microscope images are displayed on monitor 10.

Functions of the biochemical substance observing apparatus will be explained with reference to FIG. 2. Aperture 6a is formed in holder 6. Optical system 13 containing objectives 3a is placed under aperture 6a. Plate 7 is held on holder 6. The position of holder 6 is adjusted so that optical system 13 is located under well 8 of plate 7. Camera 14 is disposed under optical system 13 for capturing the microscope images within well 8 via optical system 13. Optical system 13 has focus controller 15. Controller 15 moves a focal position of optical system 13 while the microscope image is captured with camera 14 or observed directly with eyepieces 4. Controller 15 supplies numeric data of the focus-shift-distance for changing the focal point of optical system 13.

Operating unit 16 includes a switch and a keyboard disposed on operating panel 11 and operates to move a focal point and to capture images with camera 14. Display 17, monitor 10 in FIG. 1, displays microscope images captured with camera 14 and a guide screen for the operator's input. Control unit 18, a CPU, controls the overall operation of the biochemical substance observing apparatus. Focal point storing unit 19 stores a predetermined focal point of optical system 13. Based upon supplied data of the focal point stored in storing unit 19, control unit 15 controls optical system 13 to focus on the predetermined focal point.

Wells 8 in plate 7 having biochemical substances will be explained with reference to FIG. 3A and FIG. 3B. Plate 7 is made of transparent materials such as resins. As shown in FIG. 3A, inside of the bottom of well 8 is a transparent area, i.e., disposing area 8a, on which the biochemical substance is disposed. A cross-shaped mark is inscribed on outside bottom 8b of each of the wells 8. The mark is a focusing mark M used for observing the inside of well 8 from underneath. Focusing mark M is used as a reference point when the observer focuses the optical system on the object to be observed.

Figure 3B:
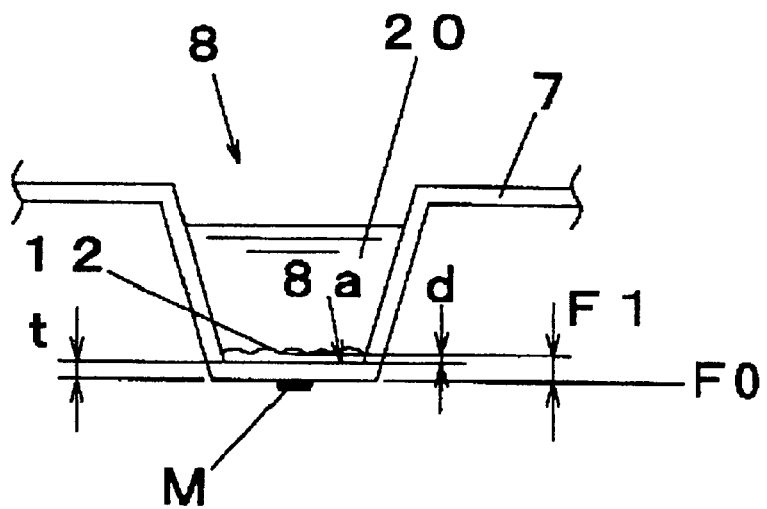

FIG. 3B shows well 8 during observation. Culture solution 20 is poured in well 8, and biochemical substance 12 in the solution is disposed on disposing area 8a. The vertical position of the observed area is specified by small distance (d) from disposing area, where distance (d) is determined according to the type of the biochemical substance. That is, the vertical position is determined by adding distance (d) to known thickness (t) of the bottom of the well.

Focus-shift-distance F1 corresponding to distance (d+t) is determined and stored as focal-point data for the type of the biochemical substance. The optical system focuses on focusing mark M (focus position F0) of outside bottom 8b, and then, the focal point of the system is shifted upward by only focus-shift-distance F1. This shift allows the optical system to focus on a proper position.

Focusing mark M is inscribed outside of the bottom of well 8, and besides, may be formed by attaching a transparent film with the mark M thereon. Furthermore, the mark M may be not only formed on the outside bottom 8b, but also on disposing-area 8a.

Figure 4A:
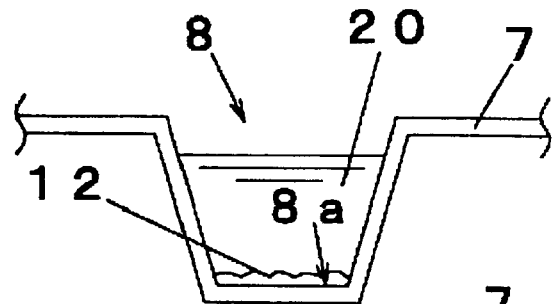
FIGS. 4A–D illustrate a method for observing biochemical substances in accordance with the embodiment.
Figure 4B:
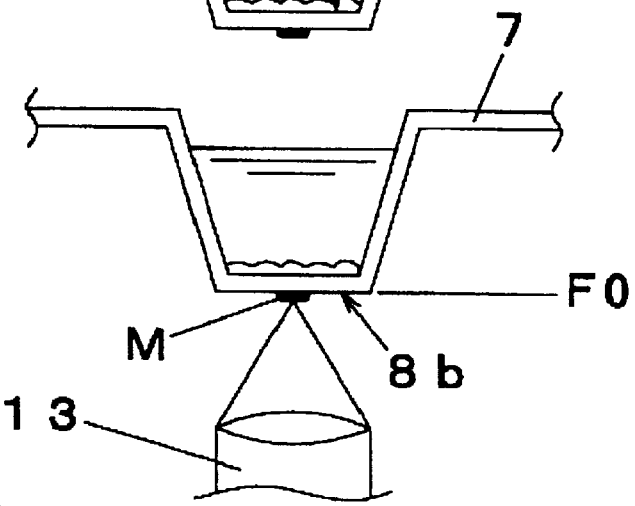

Now, a method of observing the biochemical substance with the above observing apparatus is described with reference to FIGS. 4A to 4D and FIGS. 5A to 5D. In FIG. 4A, biochemical substance 12 is disposed on disposing-area 8a of well 8 of plate 7. Biochemical substance 12 is covered with culture solution 20. When observing the substance 12, optical system 13 focuses on focusing mark M as shown in FIG. 4B. Focus position F0 of outside bottom 8b is thus detected.

Figure 4C:
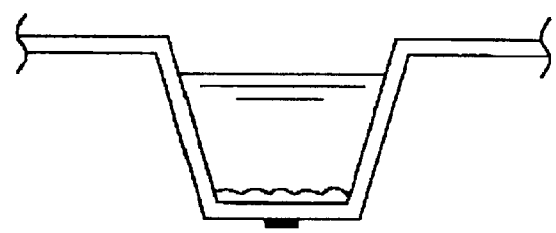
Figure 4C:
Figure 4D:
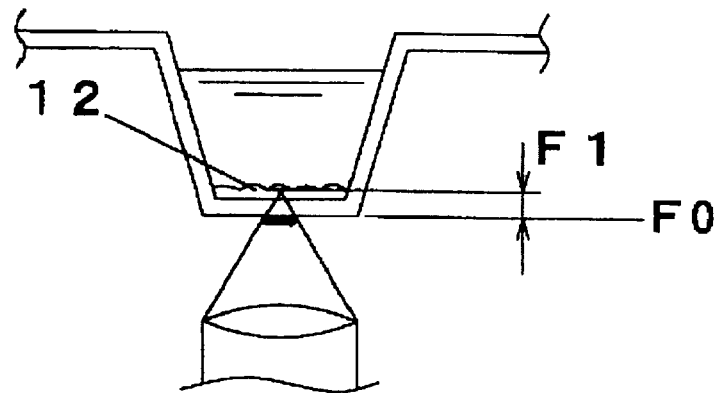

Then, as shown in FIG. 4C, focus controller 15 shifts the focal point of optical system 13 by focus-shift-distance F1, which is previously stored, vertically upward from focus position F0. This shift compensates for a displacement of focus between the observed position and focusing mark M. As a result, optical system 13 properly focuses on the object to be observed as shown in FIG. 4D. Under this situation, biochemical substance 12 is captured with camera 14 through optical system 13 and observed.

Figure 5A:
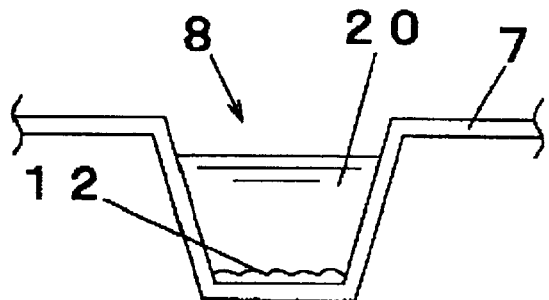
FIGS. 5A–D illustrate the method for observing in accordance with the embodiment.
Figure 5B:
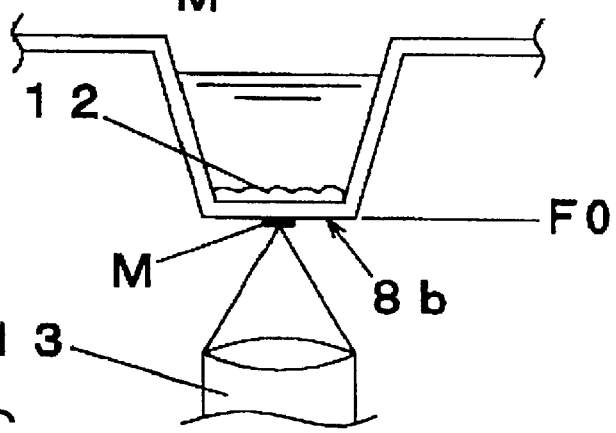
Figure 5C:
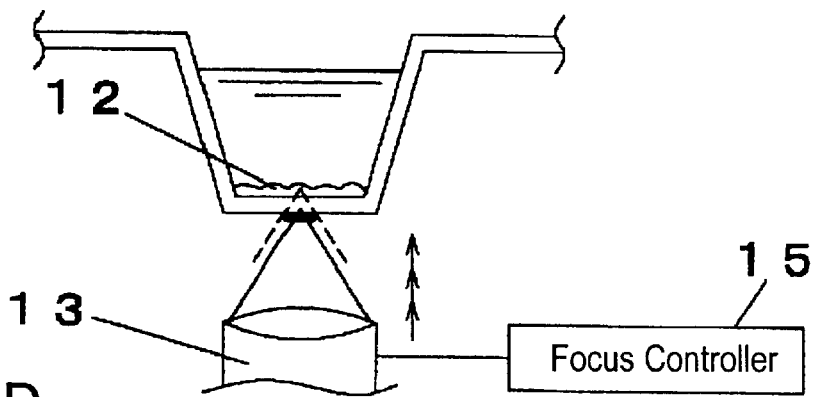
Figure 5D:
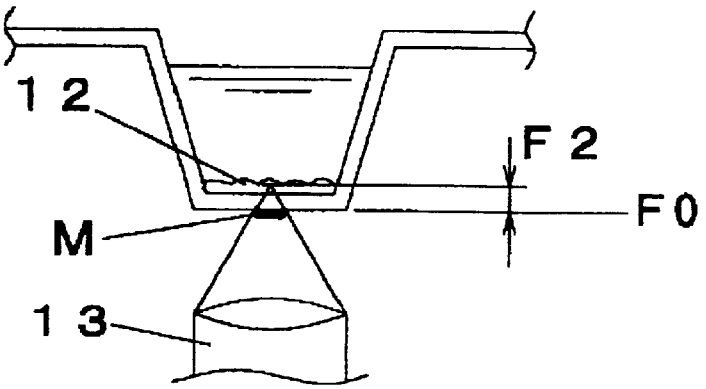

Another method of observing the biochemical substrate will be explained with reference to FIGS. 5A to 5D. The method requires the following operations before undergoing the above-mentioned method. In FIG. 5A and FIG. 5B, optical system 13 focuses on focusing mark M on the outside bottom 8b, similar to FIG. 4A and FIG. 4B. Then, as shown in FIG. 5C, biochemical substance 12 is observed while focus controller 15 gradually shifts the focal point of optical system 13 vertically upward from focus position F0. A focus position where a desired image is obtained is determined as focus shift distance F2, a distance from focus position F0. Focus shift distance F2 is stored in focus position storing unit 19.

After that, the biochemical substance 12 is observed in the same procedure as shown in FIG. 4A to FIG. 4D. Focus shift distance F2 is used in the observation instead of focus-shift-distance F1 as shown in FIG. 4C.

According to the embodiment, even when the obtained image is unclear and when the optical system hardly focuses on the biochemical substance, the substance can be focused on and observed by referring to the focusing mark. As a result, the operation of the observation in improved in efficiency, and the accurate focusing operation can be applied to an automatic focusing function.

What is claimed is:

1. An observing apparatus for observation a substance, said observing apparatus comprising:
    a container including a transparent area, wherein an inside surface of said transparent area is where the substance is to be disposed;
    an optical system being operable to observe the substance from an outside surface of said transparent area;
    a focusing mark being disposed on one of said inside surface and said outside surface of said transparent area;
    focus-shift means for shifting a focal point of said optical system;
    a focus-position storing unit being operable to store a focus-shift-distance of said optical system from said focusing mark to the substance; and
    a control unit being operable to control said focus shift means to shift the focal point of said optical system by the focus-shift-distance stored in said focus-position storing unit after said optical system focuses on said focusing mark.

2. An observing apparatus according to claim 1, further comprising a focus-shift-distance output means for outputting the focus-shift-distance as numerical data.

3. A method of observing a substance with an observing apparatus comprising a container including a transparent area, wherein an inside surface of the transparent area is where the substance is to be disposed and on which a focusing mark is disposed, and an optical system being operable to observe the substance from an outside surface of the transparent area, said method comprising:
    storing a focus-shift-distance corresponding to a distance between a position of the focusing mark and an observed position of the substance; and
    shifting a focal point of the optical system by the stored focus-shift-distance after the optical system focuses on the focusing mark.

4. A method according to claim 3, further comprising determining the focus-shift-distance by making the optical system focus on the focusing mark.

5. A method according to claim 4, wherein said determining of the focus-shift-distance comprises determining the observed position while shifting the focal point of the optical system, and determining the focus shift distance based on the observed position.

6. An observing apparatus for observing a substance, said observing apparatus comprising:
    a container including a transparent area, wherein an inside surface of said transparent area is where the substance is to be disposed;
    an optical system being operable to observe the substance from an outside surface of said transparent area;
    a focusing mark being disposed on one of said inside surface and said outside surface of said transparent area;
    a focus-shift device being operable to shift a focal point of said optical system,
    a focus-position storing unit being operable to store a focus-shift-distance of said optical system from said focusing mark to the substance; and a control unit being operable to control said focus shift device to shift the focal point of said optical system by the focus-shift-distance stored in said focus-position storing unit after said optical system focuses on said focusing mark.

7. An observing apparatus according to claim 6, further comprising a focus-shift-distance output device being operable to output the focus-shift-distance as numerical data.

8. A method of observing a substance with an observing apparatus comprising a container including a transparent area, wherein an inside surface of the transparent area is where the substance is to be disposed and an outside surface of the transparent area having a focusing mark disposed thereon, and an optical system being operable to observe the substance from an outside surface of the transparent area, said method comprising:

storing a focus-shift-distance corresponding to a distance between a position of the focusing mark and an observed position of the substance; and shifting a focal point of the optical system by the stored focus shift distance after the optical system focuses on the focusing mark.

9. A method according to claim 8, further comprising determining the focus-shift-distance by making the optical system focus on the focusing mark.

10. A method according to claim 9, wherein said determining of the focus-shift-distance comprises determining the observed position while shifting the focal point of the optical system, and determining the focus shift distance based on the observed position.

* * * * *